Sept. 1, 1964          B. E. CARLSON         3,146,839
ELECTRONIC LOAD INDICATING DEVICE FOR VEHICLES
WITH FLOATING BODY MOUNTING
Filed March 5, 1963                       3 Sheets-Sheet 2
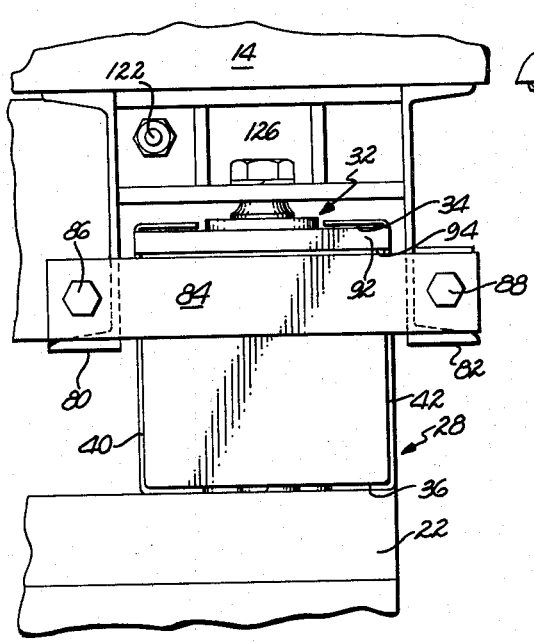
FIG. 3
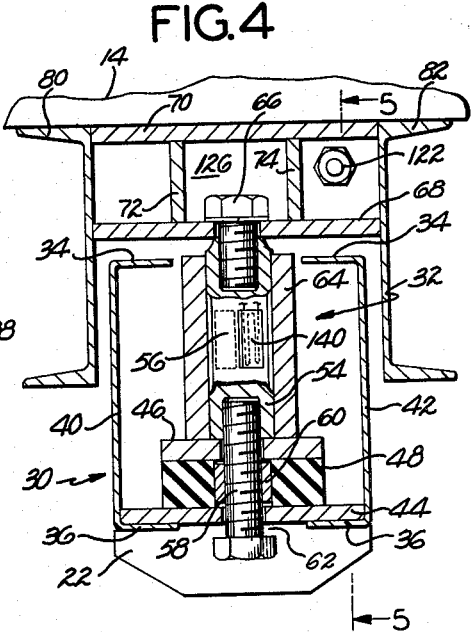
FIG. 4
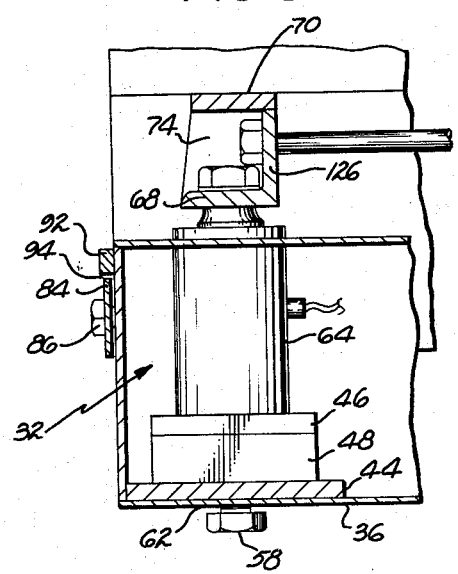
FIG. 5
FIG. 6
BERNARD E. CARLSON
INVENTOR.
BY
ATTORNEY Sept. 1, 1964　　　　　B. E. CARLSON　　　　　3,146,839
ELECTRONIC LOAD INDICATING DEVICE FOR VEHICLES
WITH FLOATING BODY MOUNTING
Filed March 5, 1963　　　　　　　　　　　3 Sheets-Sheet 3

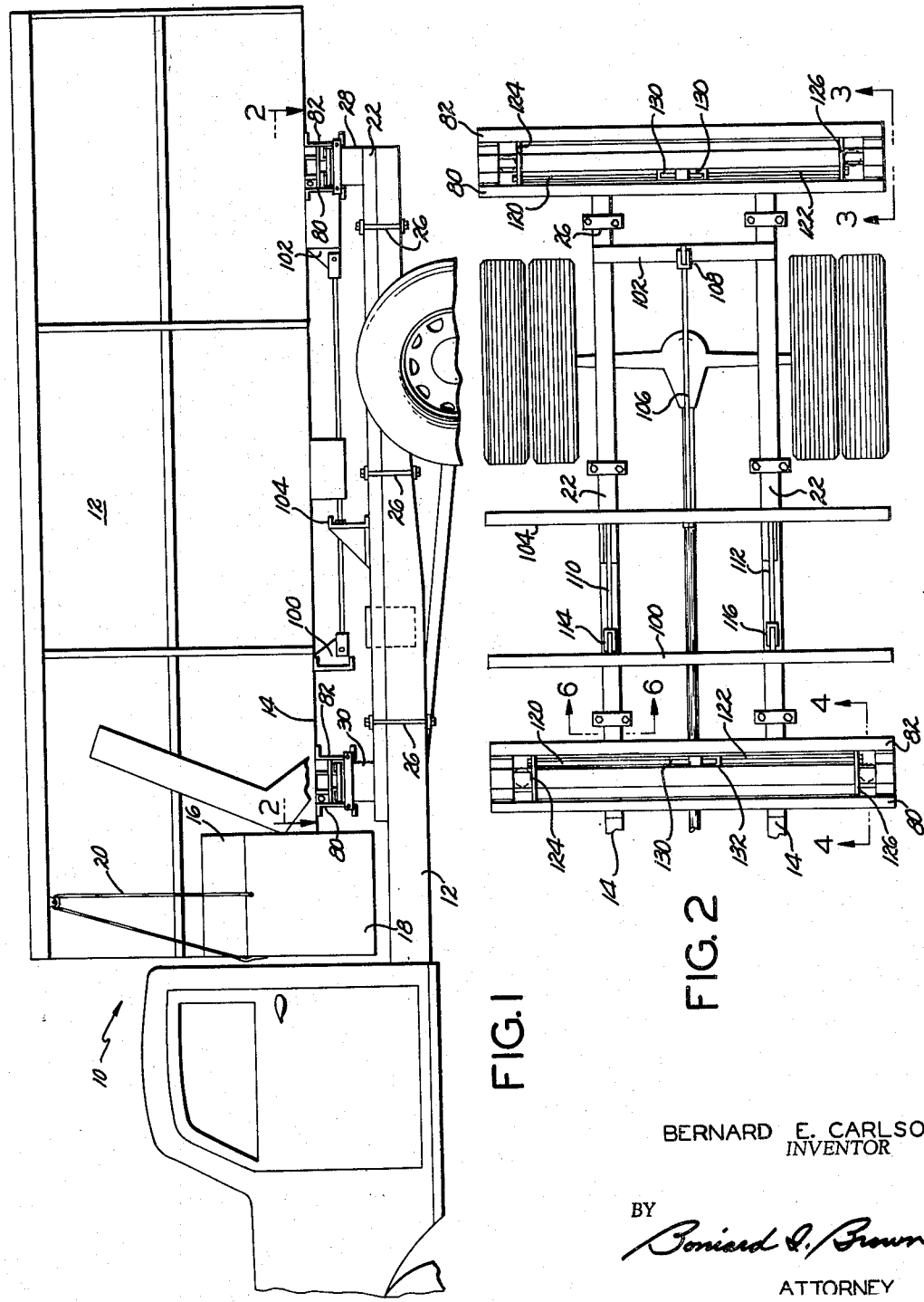

BERNARD E. CARLSON
INVENTOR.

BY
*Bernard A. Brown*
ATTORNEY 2,146,839
Patented Sept. 1, 1964

1

3,146,839
ELECTRONIC LOAD INDICATING DEVICE FOR VEHICLES WITH FLOATING BODY MOUNTING
Bernard E. Carlson, 1383 N. 2nd Ave., Upland, Calif.
Filed Mar. 5, 1963, Ser. No. 263,045
5 Claims. (Cl. 177—136)

The present invention relates generally to means or systems for electrically indicating the weight or load on a vehicle; more particularly, the invention relates to such a system wherein electrical transducers are utilized to indicate weight and wherein a vehicle body to be weighed is floatingly mounted for weighing and is restrained in such manner that damaging stress is not applied to the transducers.

The system of the invention utilizes transducers or electronic load cells for indicating the weight or load on a vehicle, typically a load in a truck bed or body, and provides floating mounting of the bed or body atop the transducers while restraining vertical, longitudinal or lateral movement of the bed relative to the truck frame. The system provides for the electronic weighing of the bed while the vehicle is in motion in service. A typical use of the system is the measurement of the weight in the vehicle body after successive portions of a load are unloaded, as in the commercial feeding of cattle, where the weight of feed discharged on successive partial unloadings must be determined. The floating characteristic is provided by structure which permits vertical movement of the vehicle body or bed, whereby it acts on the transducers or load cells to produce accurate response, but which limits movement of the body or bed to prevent the election of damaging tensile stress on the transducers or load cells; restraining means connected between the vehicle body and frame serve to restrain longitudinal and transverse movement of the body relative to the frame without producing frictional forces between the body and the load cells, which would affect weight readings.

The system provides for the accurate, convenient weighing of loads in vehicle beds or bodies, by making possible the utilization of transducers such as electronic load cells which are electrically connected with conveniently positioned indicating instruments. Cumbersome, inconvenient weighing and indicating mechanisms are eliminated.

It is therefore an object of the present invention to provide improved accuracy and convenience in the weighing of vehicle body loads in service.

It is an object of this present invention to provide new and improved means for the electronic weighing of vehicle beds in service.

An object of the invention is the provision of an improved electronic load indicating system according to the foregoing object, wherein the vehicle bed or body to be weighed is floatingly mounted in such manner that damaging stress cannot be exerted on transducers utilized in measuring the load.

It is an object of the invention to provide an improved electronic load indicating system according to the foregoing objects, wherein stop structure positively limits upward movement of the vehicle bed or body relative to the vehicle frame, thereby preventing exertion of damaging stress to the transducers.

An object of this invention is the provision of an electronic load indicating system according to the foregoing objects, wherein the system is implemented by the provision of longitudinal and lateral restraining means operably connected between the vehicle bed and the frame.

An object of the present invention is the provision of a system according to the foregoing objects wherein ease of operation is provided by control and indicating means electrically connected with the transducers and conveniently positioned for use by an operator.

Other objects, features and advantages of the present invention will become apparent to those versed in the art from a consideration of the following description, the appended claims and the accompanying drawings, wherein:

FIGURE 1 is an elevational diagrammatic view of a truck wherein the electronic load indicating system of the invention is embodied;

FIGURE 2 is a sectional view taken at line 2—2 of FIGURE 1;

FIGURE 3 is a partial elevational view taken at line 3—3 of FIGURE 2;

FIGURE 4 is a partial elevational sectional view taken at line 4—4 of FIGURE 2;

FIGURE 5 is a sectional view taken at line 5—5 of FIGURE 4, showing interior details of a load cell;

FIGURE 6 is a sectional view taken at line 6—6 of FIGURE 2, showing details of a shackle assembly;

Figure 7:
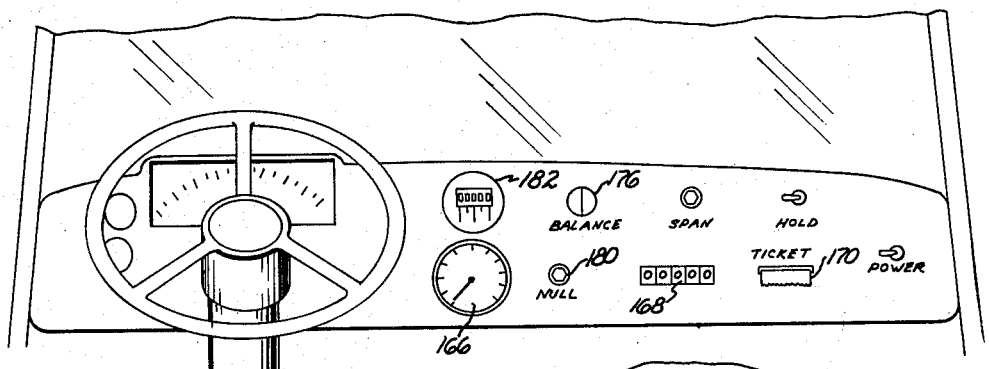
FIGURE 7 is a view of a vehicle instrument panel, showing a control panel for the load indicating system of the invention.
Figure 8:
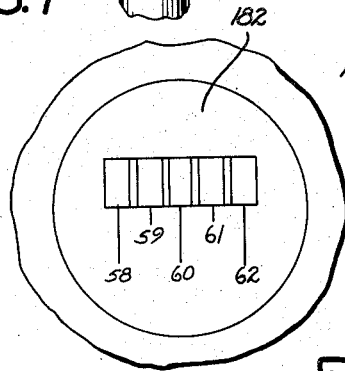
FIGURE 8 is an enlarged view of a cycle meter of the control panel of FIGURE 7.
Figure 9:
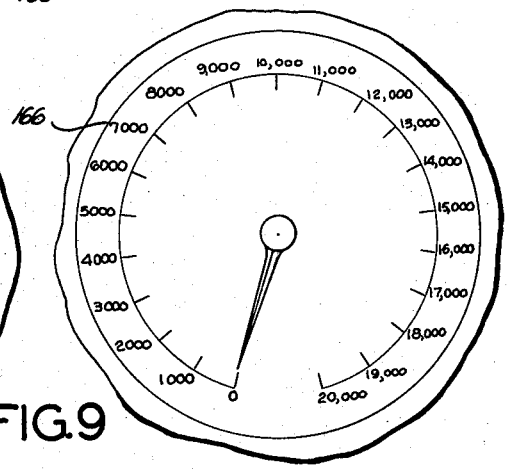
FIGURE 9 is an enlarged view of a weight indicating dial which constitutes a part of the control panel of FIGURE 7.

Referring to the drawings, and particularly to FIGURE 1, a vehicle or truck 10 is shown as including a body or bed 12 supported on a frame 14. The body 12 is a conventional type adapted for transporting cattle feed and the like, and has a discharge chute 16 with a sliding door 18 operable by means of a cable 20.

Platform members 22 are secured to the frame 12 by four shackles 26, as shown in FIGURES 1, 2 and 6.

Secured as by welding to, and extending transversely of the platform members 22 are mounting channels 28 and 30, one channel being adjacent to the forward ends of the platform members and the other being at the trailing ends of the platform members.

A load cell or transducer 32 is disposed within and adjacent to each end of each of the mounting channels 28, 30. Each channel comprises channel members 40 and 42, which have confronting inwardly extending upper flange portions 34 and lower flange portions 36 (FIGURE 4). A bottom plate 44 is secured to the lower flanges 36 by welding, and is spaced from a supporting ring member 46 by an annular pad or cushion 48, which is preferably fabricated of a resilient material such as neoprene.

As best shown in FIGURE 4, the load cell 32 is positioned atop the supporting ring member 46. The electronic load cell comprises a load-receiving stem 54, which is internally threaded at its respective ends, and which has a reduced intermediate portion 56. A bolt 58 extends upwardly through a central opening in bottom plate 44 and through axial openings in the cushion 48 and supporting ring member 46. A bushing 60 is disposed between the bolt and the cushion, as shown. A clearance 62 is defined or provided between the head of bolt 58 and bottom plate 44.

A bolt 66 is threadedly secured in the upper end portion of the stem 54 and extends through an opening in a lower plate member 68, against which its head is secured. Plate 68 is rigidly secured, as by welding, to vertical rib members 72, 74, which are similarly secured to an upper plate member 70. The plate members 68, 70 are secured by welding between rails 80 and 82, which are welded to the underside of the truck body 14.

A first limit member 84 is rigidly connected with the truck body and the rails 80, 82 by bolts 86, 88, which secure the member to structural members welded to the rails, as shown. A second limit member 92 is rigidly secured to the truck frame by being welded between the upper portions of mounting channel members 40 and 42.

Limit members 84 and 92 normally define a limit clearance 94, this clearance being less than the clearance 62 below the transducer 32 (FIGURE 4) between the head of bolt 58 and the bottom plate 44.

From the foregoing and from the geometry of the parts, it will be understood that the truck body rests or floats atop the load cells, and that this floating mounting causes the load or weight of the body to be transferred to the load cells. Upward movement of the truck body 12 relative to the frame is limited by the limit members 84 and 92 to prevent damaging tension loading of the load cells. The clearance 94 between limit members 84 and 92 being less than the clearance 62 between the head of bolt 58 and bottom plate 44 of the load cell, it will be understood that vertical relative movement between the truck body and the frame, to a degree which would exert damaging tension on the load cell stem 56, is prevented. Such vertical relative movement, typically effected by bouncing and road shock during vehicle movement, would otherwise exert damaging tension on the load cell.

The floating mounting includes means for restraining longitudinal and lateral movement of the body relative to the frame, without producing extraneous forces, such as friction forces, which would cause inaccurate transducer load indications. Referring to FIGURES 1 and 2, transverse structural members 100 and 102 are secured to the underside of the truck body. A similar transverse structural member 104 is secured to the platform members 22 on the truck frame 12. A longitudinal tie member or rod 106 is attached to transverse member 104 at one end and is pivotally connected at its other end to the transverse member 102 on the truck body by means of a yoke 108 and a pivot pin. The tie rod 106 is thus connected to prevent rearward movement of the body relative to the frame. Longitudinal restraining or tie rods 110, 112 are secured to the transverse member 104 on the frame and are pivotally connected relative to the truck bed at their opposite ends by pivotal connections to transverse member 100 by means of yokes 114, 116 and pivot pins. The rods 110, 112 thus prevent forward movement of the truck body relative to the frame.

Lateral movement of the truck body relative to the frame is prevented by restraining rods or tie members 120, 122, which are disposed between each pair of rails 80, 82, one pair of rails 80, 82 being secured under the forward end of the body and the other pair of rails 80, 82 being secured under the rear portion of the body, as shown. Each rod 120 has one end secured to a member 124 rigidly secured to the truck body, and is pivotally connected to the frame at 130 by a yoke and pin arrangement. In a similar manner, each of the restraining or tie rods 122 is secured at one end to a member 126 rigidly secured to the truck body and is pivotally connected at 132 to the frame. The truck body is therefore secured against longitudinal and lateral movement relative to the truck frame, while limited vertical movement of the truck body is permitted.

It is to be understood that various forms of longitudinal and lateral restraining means may be utilized for preventing movement of the vehicle bed or body relative to the frame, within the scope of the invention. For example, instead of the lateral tie rods 120, 122, a single longer rod might be used, one end being secured by appropriate means relative to the frame, and the other end being attached to the vehicle bed. Such an elongated rod, extending substantially the width of the truck bed, would reduce the angle of deflection of the rod relative to the horizontal in accordance with vertical vehicle bed movement, thereby reducing a vertical component of force applied to the load cells as result of restraining tension in the rod. Another example would be the utilization of tie cable members instead of rods, thereby eliminating the necessity for pivotal connections, such as those at 114, 116, 130 and 132 (FIGURE 2).

The transducers are preferably electronic load cells, although other types of transducers or load cells can be utilized. As shown in FIGURE 4, the load cell includes conventional electrical strain gauge 140 secured to the reduced portion of the stem 54. The application of a load to the stem results in deformation of the stem and the strain gauge, which produces an electrical response proportional to this deformation and to the load applied to the stem, in a manner well known in the art.

The angular resilient cushion 48, best shown in FIGURE 4 and hereinbefore described, permits limited angular movement of the transducer, and thereby prevents inaccurate transducer output which might otherwise result from frictional forces and other extraneous forces associated with the transducer.

Figure 10:
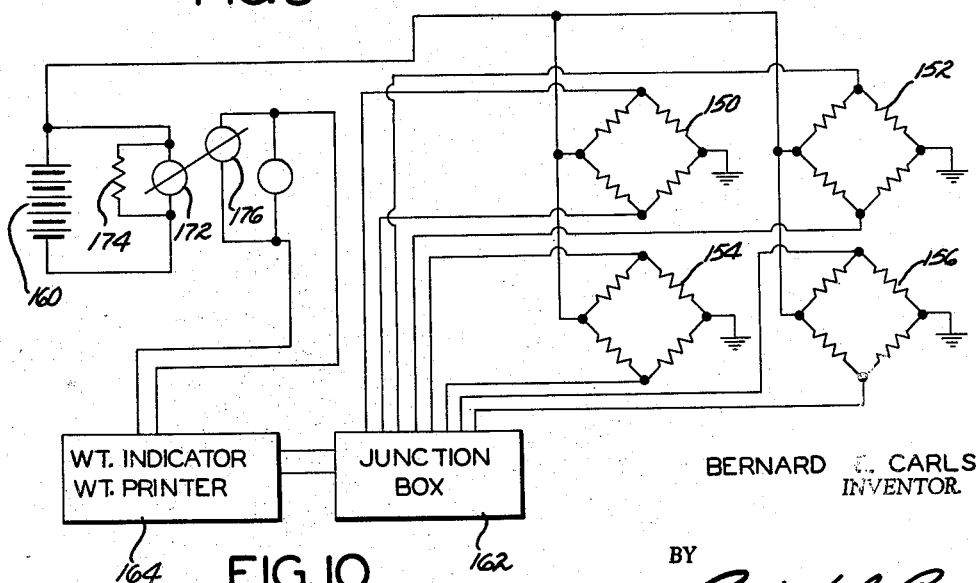
FIGURE 10 is a schematic diagram of the electronic circuitry of the load indicating system of the invention.

The strain gauge 140 of each load cell is electrically connected to form one leg of one of the bridge circuits 150, 152, 154 and 156, as shown in FIGURE 10. The bridge circuits are energized by a battery 160 and their outputs are fed to a junction box 162, which comprises an amplifier and an integrating circuit for amplifying and integrating the load cell signals. The junction box is connected with a load or weight indicating system 164, which may preferably comprise separate load indicating units, such as the weight dial 166, the digital weight indicating unit 168 and the weight printer 170, shown in FIGURE 7. A potentiometer 172 and a parallel resistor 174 provide means for adjusting the power supply to the bridge circuits. The potentiometer 172 is ganged with a second potentiometer 176, which is connected to the weight indicating means for adjusting the weight indicating means to its null or zero position to provide a tare adjustment to correspond with the weight of the empty truck body on the load cells. A null indicator 180 is provided on the instrument panel to indicate this null or zero position. As shown in FIGURE 7, the potentiometer 176 is preferably positioned on the truck instrument panel, and is readily operable. A cycle meter 182 is mounted on the instrument panel.

In the operation of the system, with the tare weight of the vehicle body 12 on the transducers 32 the clearance 62 (FIGURE 4) is provided between the head of bolt 58 and the bottom plate 44 of each load cell. The load in the body, the weight to be measured, deforms the stem 56 and the strain gauge 140 to produce electrical output in accordance with the load. The outputs or signals from the individual load cells are amplified and integrated by the electrical circuitry of the junction box 162, the output of which is fed to the weight indicating and printing means hereinbefore mentioned.

It will be appreciated that the instruments and controls on the vehicle instrument panel provide for the convenient, rapid operation and adjustment of the system of the invention, whereby accurate measurements of the loads and changes of loads in the vehicle body are made.

From the foregoing description, those versed in the art will appreciate that the present invention achieves the objects and realizes the advantages hereinbefore mentioned, as well as other advantages which are apparent from the description.

Although a specific embodiment of the present invention has been illustrated and described herein, it will be understood that the same is merely exemplary of presently preferred embodiments capable of attaining the objects and advantages hereinbefore mentioned, and that the invention is not limited thereto; variations will be readily apparent to those versed in the art, and the invention is The inventor claims:

1. A weight or load measuring system for a vehicle having a frame and a body, said system comprising a plurality of sensitive electro-mechanical transducers interposed between the frame and the body, said transducers being responsive to loads applied thereto to produce electrical output variable in accordance with the load, and means floatingly mounting the vehicle body to permit limited vertical relative movement between the body and the frame, means including said mounting means to permit limited longitudinal and transverse movement of the body relative to the frame whereby loading stress is applied to the transducers in accordance with the body weight, said mounting means including mutually engageable limit members associated with each of said transducers, said limit members being respectively secured to the frame and to the body, whereby vertical movement of the body relative to the frame is positively limited to prevent damaging stress on the transducer.

2. A weight or load measuring system for a vehicle having a frame and a body, said system comprising at least one sensitive transducer interposed between the frame and the body, said transducer being responsive to loads applied thereto to produce electrical output variable in accordance with the loads, means floatingly mounting the vehicle body to permit limited vertical relative movement between the body and the frame, said mounting means permitting limited longitudinal and transverse movement of the body relative to the frame, said mounting means including mutually engageable limit members respectively secured to the frame and to the body, whereby vertical movement of the body relative to the frame is positively limited to prevent damaging stress on the transducer, and restraining means connected between the body and the frame for restraining longitudinal and transverse movement of the body relative to the frame, whereby the body is floatingly mounted relative to the frame and only the load to be weighed is applied to the transducer, to substantially eliminate effects of extraneous forces on said transducer output.

3. A load measuring system according to claim 2, wherein said restraining means comprise at least one tie member interconnecting the frame and the body to restrain transverse movement, and at least one tie member interconnecting the frame and the body to restrain longitudinal movement.

4. A weight or load measuring system for a vehicle having a frame and a body, said system comprising at least one sensitive transducer interposed between the frame and the body, said transducer being responsive to loads applied thereto to produce electrical output variable in accordance with the loads, said transducer comprising a resilient cushion positioned to be subject to stress applied to the transducer, and said cushion being positioned to permit limited angular movement of the transducer to prevent inaccurate transducer output resulting from frictional forces associated with the transducer, and means floatingly mounting the vehicle body to permit limited vertical relative movement between the body and the frame, whereby loading stress is applied to the transducer in accordance with the body weight, said mounting means including mutually engageable limit members respectively secured to the frame and to the body, whereby vertical movement of the body relative to the frame is positively limited to prevent damaging tensile stress on the transducer.

5. A weight or load measuring system for a vehicle having frame and a body, said system comprising at least one sensitive transducer interposed between the frame and the body, said transducer being responsive to loads applied thereto to produce electrical output variable in accordance with the loads, and means floatingly mounting the vehicle body to permit limited vertical relative movement between the body and the frame, whereby loading stress is applied to the transducer in accordance with the body weight, said mounting means including a first limit member rigidly secured relative to the body and a second limit member rigidly secured relative to the frame and cooperating with the first limit member normally to define a first vertical clearance therebetween, said transducer having a part thereof cooperating with a member rigidly secured to the frame to define a second vertical clearance larger than said first clearance between said limit members, whereby said limit members engage to prevent relative vertical movement between the body and the frame beyond a distance where damaging load would be applied to the transducer.

References Cited in the file of this patent
UNITED STATES PATENTS

| | | |
|---|---|---|
| 2,482,027 | Poole | Sept. 13, 1949 |
| 2,793,851 | Ruge | May 28, 1957 |
| 2,802,660 | Williams | Aug. 13, 1957 |
| 2,813,709 | Brier | Nov. 19, 1957 |
| 3,078,937 | Mehki et al. | Feb. 26, 1963 |
| 3,081,833 | Kester | Mar. 19, 1963 |